United States Patent [19]

Adolph

[11] Patent Number: 4,569,227

[45] Date of Patent: Feb. 11, 1986

[54] TEST STATION FOR FUEL INJECTION PUMP

[75] Inventor: Dietrich Adolph, Albershausen, Fed. Rep. of Germany

[73] Assignee: Robert Bosch GmbH, Stuttgart, Fed. Rep. of Germany

[21] Appl. No.: 664,888

[22] Filed: Oct. 25, 1984

[30] Foreign Application Priority Data

Dec. 22, 1983 [DE] Fed. Rep. of Germany ....... 3346408
Jan. 27, 1984 [DE] Fed. Rep. of Germany ....... 3402804

[51] Int. Cl.⁴ .......................................... G01M 15/00
[52] U.S. Cl. ...................... 73/119 A; 73/3
[58] Field of Search ........... 73/119 A, 861.18, 861.21, 73/3

[56] References Cited

U.S. PATENT DOCUMENTS 3,958,458  5/1976  Foreman et al. ................. 73/861.18
4,347,747  9/1982  Srinivasan ........................ 73/861.18

Primary Examiner—Jerry W. Myracle
Attorney, Agent, or Firm—Michael J. Striker

[57] ABSTRACT

A test station for fuel injection pump includes a test container enclosing an air space into which a fuel injection nozzle under test opens. A microphone communicates with the air space to convert air pressure pulses resulting during each injection into a corresponding electrical signal. The integral of the output signals from the microphone is a measure for the quantity of the injection fuel. The total quantity of injected fuel can be determined by a calibration system.

14 Claims, 4 Drawing Figures

TEST STATION FOR FUEL INJECTION PUMP

BACKGROUND OF THE INVENTION

The present invention relates in general to a method of and a device for testing the quantity of fuel injected by a nozzle of an injection pump.

The adjustment of fuel injection pumps takes place at a test station at which the quantity of fuel injected by each injection nozzle is measured by injecting the fuel over a predetermined time interval into graduated measuring glasses. Then the operator reads the amount of injection at the miniscus edge of the test oil in the measuring glass. It is true that this prior art method is accurate, nevertheless, it is time consuming inasmuch the operator must wait till the injected fuel completely defoams. Consequently, certain time delay is always necessary between the injection and the measurement. In addition after the completion of the measuring process, measuring glasses must be emptied which step again requires additional time. For achieving an accurate measurement it is necessary to perform several fuel injecting cycles and the quantity of fuel during a single injection pulse and its time behavior cannot be determined.

SUMMARY OF THE INVENTION

A general object of the present invention is to overcome the aforementioned disadvantages.

More particularly, it is an object of the invention to provide an improved method of and device for determining the quantity of fuel injected by a nozzle of an injection pump which make a continuous measurement possible.

Another object of this invention is to enable the measurement of injected amount of fuel in each single injection pulse and also to measure its time behavior if desired.

A further object of this invention is to provide such an improved method and device which are suitable for a fast, automatic testing.

In keeping with these objects and others which will become hereafter, one feature of the invention resides, in a testing method of the aforedescribed kind, in the steps of injecting fuel through a nozzle under test into a closed air space and picking up the resulting pressure pulse by a microphone, and then evaluating an integral of output signals from the microphone as a measure of the amount of the injected fuel.

The device for carrying out the method of this invention includes a container for enclosing an air space at its top part and a body of sealing liquid at its bottom part, means for mounting a nozzle under test at the top part so as to inject fuel into the air space in the container, a microphone communicating with the air space to convert air pressure pulses into corresponding electrical signals, and an electric integrator for integrating the electric signals to produce a measure of the quantity of the injected fuel.

Preferably, the level of the liquid body of the container is set constant by an overflow device. In this manner, the air space always maintains its predetermined volume and the liquid body provides a proper seal for the air pressure pulses. In addition, the liquid body can be easily discharged. It is also of advantage when the air space is under a certain over-pressure which insures that the testing conditions almost completely simulate those in the actual motor vehicle. In the device of this invention the integrated output signals from the microphone continuously provide a measure of the injected fuel quantity. By a calibrating device it is possible to convert the relative measured value into an absolute one so that the injected fuel amount can be directly determined.

In the preferred embodiment, the microphone communicates with the air space in the container via a conduit which protects the microphone against sprinkling. It is also advantageous when a plurality of nozzles are mounted to a single container. By this measure, the cost of the testing device is considerably reduced, inasmuch only one microphone can selectively pick up the air pressure pulses causes by individual nozzles. The correlation of individual nozzles to the result of measurement is achieved in a simple manner by correlating the position of the driving shaft to the position of the injection pump under test. In order to achieve a high degree of accuracy, it is of advantage when the measuring signals in a measuring process are summed up, and after a certain number of injection processes the volume of the injected fuel is determined. In this way the accuracy of the testing station is increased. In order to take into account the temperature effects of the measured fuel, it is of advantage when a temperature sensor is applied in the container and the test results are corrected accordingly. To produce the aforementioned overpressure in the testing container, a pressure regulator is provided in the range of the overflow device and the microphone chamber is connected to the air space in the container via a throttle. In this manner it is achieved that the overpressure builds up by itself after several injection processes and in addition the microphone takes up the relative pressure differences inasmuch as the throttle prevents fast pressure changes from acting directly on the outer wall of the microphone. The latter arrangement can be constructed in simple way by enclosing the microphone in a casing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing:

DESCRIPTION OF THE PREFERRED EMODIMENTS

Figure 1:
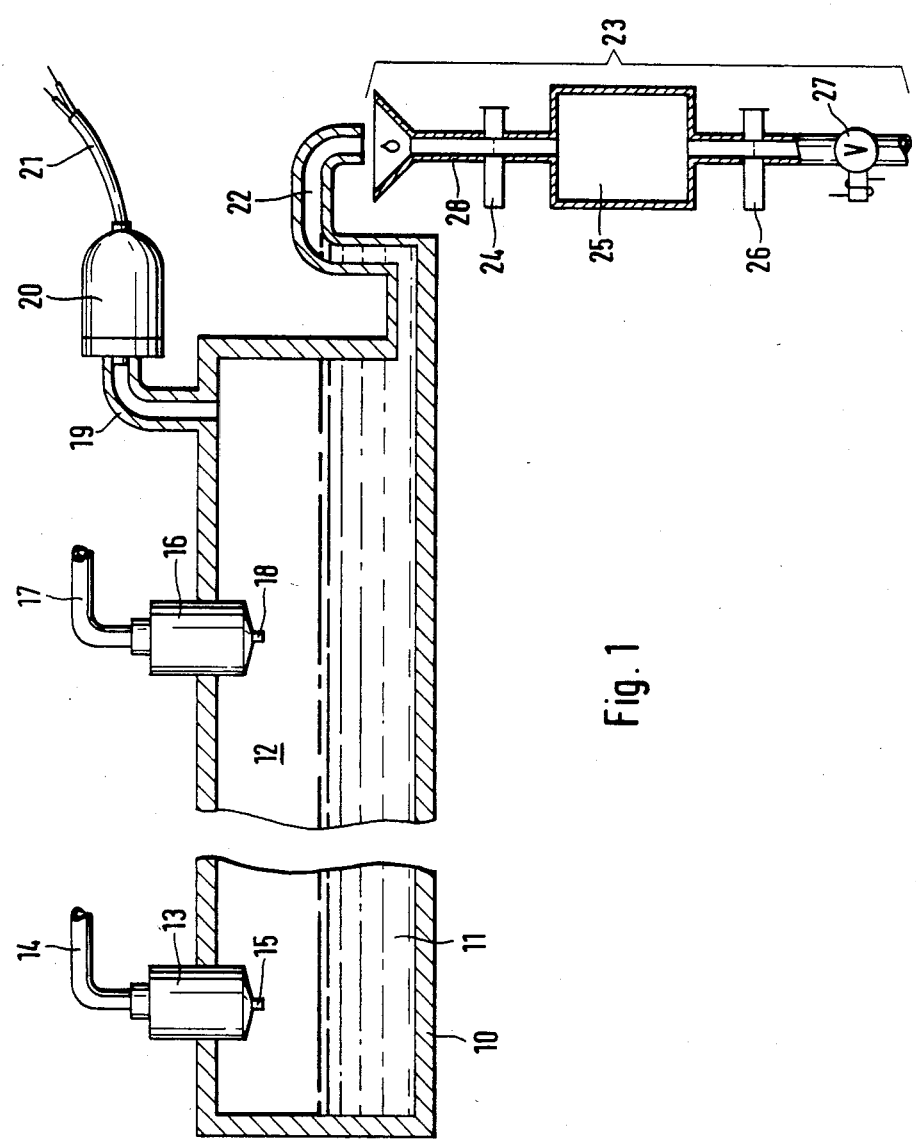
FIG. 1 shows in a sectional view a first embodiment of the testing station of this invention.

FIG. 1 shows a test container 10 which is hermetically sealed against ambient air. The container is partially filled at its bottom part with a liquid fuel body 11 and at its top part with an air volume 12. The lower part of the container 10 communicates with an overflow device 22 which keeps a constant level of the liquid body and simultaneously prevents outer air from entering the interior of the container. The top of the container is provided with mounting holes for receiving a plurality of injection nozzles under test of which only nozzles 13 and 16 are illustrated. Each nozzle includes discharge openings 15, 18 and fuel supply conduits 14, 17, the latter communicating with a non-illustrated fuel injection pump. The shaft of the pump is driven by an electric motor. The circumference of the pump shaft is provided with marks scanned by a sensor so that the angular position of the rotating shaft is always detectable. The top of the container 10 is further provided with a pressure pipe 19 leading to a microphone 20. The output conductors 21 of the microphone are connected to an electronic evaluating device which will be explained in detail below.

A calibrating device 23 is arranged below the outlet opening of the overflow device 22. The calibrating device includes an upright intake conduit 28 provided with an upper light barrier 24. The intake conduit opens into a reference volume 25. The discharge conduit at the bottom of the reference volume 25 is provided with a lower light barrier 26 followed by a solenoid valve 27. The solenoid valve controls the opening and closing of the calibrating device 23.

The basic effect underlying this invention is the arrangement of each nozzle under test in the closed air space in the test container so that each injection pulse increases the air pressure proportionately to the injected volume whereby it is irrelevant in which form the injected fuel jet compresses the enclosed air space 12. It must be only guaranteed that the injected jet enters exclusively the air space. In the interval between two injection pulses the previous air pressure is restored by the action of the overflow device 22 which discharges the received amount of the injected oil. As shown in FIG. 1, the body 11 of fuel in the test container serves both as the sealing liquid for the enclosed air space 12 and also the mass of the liquid serves as a resistance against a too fast pressure equalization after each injection process. As mentioned before, pressure pulses in the air space 12 which are proportional to the injected quantity of fuel are picked up by the microphone 20. For this purpose, capacitor microphones are particularly suitable because of their capability of operating without distortion in a broad frequency and pressure range. The time integral of the pressure course is a measure for the injected fuel volume.

Figure 4:
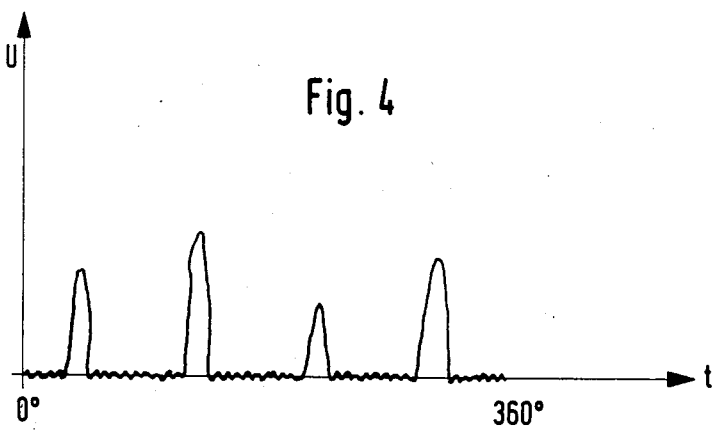
FIG. 4 is a time plot of an example of signals pick up by a microphone in the device of this invention.

An example of measurement of the quantity of injected fuel in a four cylinder engine is illustrated in the plot diagram of FIG. 4. It is assumed that four injection nozzles are arranged in the test container 10. The time integral of the consecutive pressure pulses is a measure for the injected fuel volume. For the integration both the pressure pulses themselves and also signals proportional to the volume can be evaluated. For increasing the accuracy of the measurement it is of advantage when the volume proportional signal is determined from several injections.

The method of this invention can use a single microphone for picking up signals from up to 24 nozzles because the pressure pulses of individual nozzles do not overlap in time, as it will be seen from FIG. 4. The microphone acts fast enough to detect all pressure changes. The time coordination between a cylinder and an injection pulse is obtained by means of the reading of the angular position of the shaft of the injection pump. The magnitude of the air volume determines, together with the least detectable quantity of injection, the minimum pressure variation still detectable by the microphone. The magnitude of the air volume thus permits a structural adjustment of the measuring range to the sensitivity of the employed microphone 20.

Liquid discharged through the overflow device 22 can be employed with advantage for calibrating the entire measuring system. For this purpose, a reference volume 25 serves for collecting the amount of fuel discharged from the test container. The collected measuring oil is evaluated in a conventional measuring system operating as follows: solenoid valve 27 is closed so that the overflow test oil is retained in the calibrating device 23. When the level of the retained oil reaches the lower light barrier 26 the counting of the injection pulses is initiated until the reference volume 25 is completely filled up and the upper light barrier 24 produces a signal. The reference volume divided by the counted number of the injection pulses indicates the average quantity of injection per a single injection process.

In spite of the fact that measuring microphones have a high temperature stability over prolonged periods of time, the simple additional calibrating device makes it possible to calibrate the entire system to continuously calibrate the entire system in certain time intervals. In doing so it is of no consequence whether the test apparatus operates with a single nozzle or with a plurality of nozzles.

Figure 2:
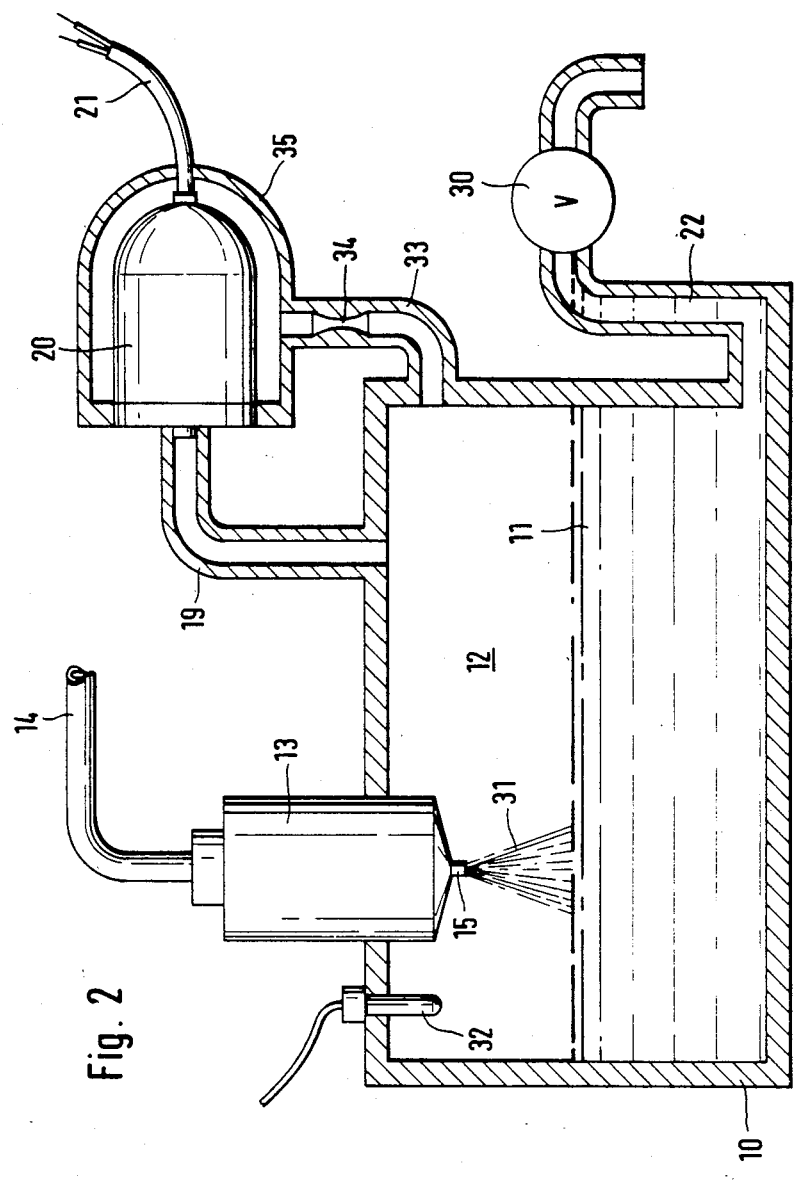
FIG. 2 is a sectional view of a second embodiment of this invention.

A further elaboration of the test arrangement according to FIG. 1 is illustrated in FIG. 2. Similarly as in the preceding example, a test container 10 encloses a body of fuel 11 which seals an air volume 12 in the upper part of the container. In the range of the overflow device 22 a pressure regulator 30 is arranged for passing overflow liquid through the device 22 only after the liquid body 11 exerts a certain pressure on the pressure regulator 30. In this example, a single injection nozzle 13 with a discharge opening 15 is used whereby a jet 31 of injected fuel is indicated in the air space 12. Fuel is supplied to the nozzle via a conduit 14 leading to a nonillustrated fuel injection pump. The top of the test container 10 also includes a temperature sensor 32 by means of which temperature dependent corrections of measured results are made possible. A pressure pipe 19 connects the air space 12 to a microphone 20. In this embodiment, the microphone is arranged in a pressure chamber 35 which communicates via a throttling member 34 and a pressure equalizing pipe 33 with the air space 12. Electric conduits 21 feed output signals from the microphone to an evaluating device.

The arrangement according to FIG. 2 enables to increase air pressure in the test container 10 to a value which is similar to fuel injection conditions in the actual cylinder of the engine. Accordingly, the test station operates under normal working conditions of a fuel injection pump. The simulation is limited to the gas counterpressure because the temperature of air in the test container must remain relatively low so that fuel ignition be prevented. The enclosure of the pressure microphone 20 is necessary for exposing the rear side of the diaphragm to average pressure in the test container, thus enabling the measurement of pressure variations similarly as in the preceding example. The pressure equalizing throttle 34 is needed for applying the average pressure to the diaphragm of the microphone. The throttle is a permanent component part of the microphone because it determines directly the lower limit frequency of the latter.

An amount of fuel corresponding to the injected fuel jet 31 can leave the test container through the pressure regulator 30 in the overflow device 22 only. The pressure regulator opens when the average pressure in the test container exceeds the opening pressure of the regulator 30. The desired air pressure in the test container is simply adjusted in such a way that an originally empty test container is so long charged via the injection nozzle with test oil until the test pressure is reached whereby the volume of the air space valve is simultaneously determined. The throttle 34 is needed for the reason that in the air space of the pressure chamber 35 behind the diaphragm of the microphone an average pressure builds up and for evaluating pressure fluctuations due to the injection the pressure equalization should not be too fast. The employed microphone can be for example the type MKH 110-1 of the firm Sennheiser.

Figure 3:
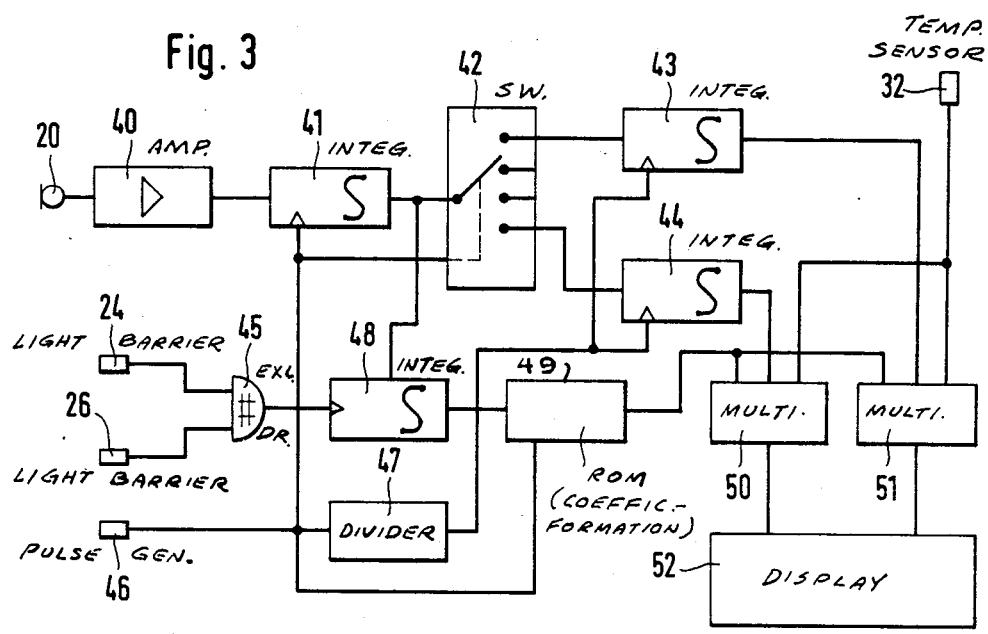
FIG. 3 is a block circuit diagram of a device for evaluating the test results.

An exemplary embodiment of a circuit for evaluating the signals from the pressure microphone is illustrated in FIG. 3. The output signal from the microphone 20 is applied via an amplifier 40 to an integrating member 41, the latter being resettable by means of an electronic switch, for example. For this purpose, a multiposition switching device 42 is connected to the output of the integrating member 41. The switching device has as many switching positions as many fuel injection nozzles are provided in the test container 10. To the uppermost switching container, an integrator 43 is connected whose output signal is applied to a multiplier 51. Other series-connections of integrators and multipliers similar to units 43 an 51 are connected to the remaining contacts of the switching device 42. For the sake of simplicity, only one series connection of an integrator 44 and a multiplier 50 are illustrated in the Figure. The outputs of multipliers 50 and 51 are connected to a display unit 52. A pulse generator 46 generates signals derived from the angular position of the driving shaft of the fuel injection pump. These angle-dependent signals are applied to the resetting input R of the integrator 41 and to the switching device 42 to reset the integrator and switch-over the device 42 to a next switching position. Furthermore, a divider 47 is connected to the output of the pulse generator 46 and the output of the divider is connected to resetting inputs of integrators 43 through 44.

As described before, elements 24 and 26 are upper and lower light barriers in the calibrating device 23. The signals from the two light barriers are applied to an exclusive OR-gate 45 whose output is connected to resetting input of an integrator 48. The data input of integrator 48 receives signals to be integrated from the output of the integrator 41. The output of the integrator 48 is connected to a coefficient forming device 49, for example, in the form of a ROM. The coefficient forming device 49 is addressed by the output from the integrator 48 before the latter is reset and, depending on the count of detected rotations of the injection pump produces a coefficient value corresponding to the average injection volume of an injection process. For this purpose, the coefficient forming device 49 is connected to the pulse generator 46. In dependency on the count of pulses counted since the takeover of the last integrated value, and from the new integrated value an address is is formed which addresses a corresponding storing block ROM of the coefficient forming device 49. In this storing block coefficient values are stored corresponding to known values of the reference volume 25. The readout reference values are applied to the multipliers 50 and 51 and multiplied by the output values from integrators 43 and 44. The computed product is applied to the display unit 52 where it is directly represented in milliliters. In addition, the temperature sensor 72 is also connected to the multipliers 50 and 51. The temperature dependent coefficients from the temperature sensors, particularly the different viscosity of fuel or of the fuel body in the test container produce the corresponding correction in the product. A higher accuracy is achievable by providing a similar temperature sensor in the fuel liquid body 11 in the test container.

The operation of the evaluation circuit of FIG. 3 will be explained in connection with the diagram of FIG. 4.

During one rotation of a driving shaft in a four cylinder engine, four injection pulses are produced which are detected by the microphone. The output signals from the microphone are amplified in amplifier 40 and then integrated in integrator 41. The integrated signal is applied via the switching device 42 to integrator 43 which is in reset condition. The integrator 43 is in the form of summer generally known in digital technology. The ouput signal from the integrator 41 is also branched before the switching device 42 to an integrator 48 connected between the calibrating device 23 and the coefficient forming device 49. Accidental noise signals which may occur between the injection pulses, due to their statistic distribution have no effect on the result of the integration.

If in the testing device of this invention the injection nozzles of a four cylinder engine are tested, then the driving shaft for the injection pump is provided with four marks separated from each other by 90° and are scanned by the pulse generator 46. After sensing the first mark which indicates the 90° angular displacement of the pump, the integrator 41 is cleared or reset. In addition, a pulse is applied to the divider 47 and to the control input of the coefficient forming device 49, and to the switching device 42 causing the latter to change its switching position by one. The new integration result from the integrator 41 is applied to the subsequent integrator pertaining to the new switching position of the device 42. Simultaneously, the integrated value in the integrator 48 is increased. After reaching a preset number of injection processes determined for each individual nozzle by the divider 47, the result is processed in the corresponding multiplier 50 or 51 and displayed on the display device 52. At the same time, the integrators 43 through 44 which are also constructed as summers, are reset The integrator 48 is switched on or off by the light barriers 24 and 26. Only when liquid level in reference container 25 is between the two light barriers 24 and 26, the integrator 48 is operative for storing the integration results of the integrator 41. The output volume from the integrator 48 before resetting the latter is supplied to the addressing input of the coefficient forming device 49 in the manner as described before and the average quantity of injected fuel for each nozzle is computed. The final result of the total injected fuel is computed by summing up the injection pulses of all individual nozzles.

The beforedescribed evaluation circuit is given by way of an example only and shows a simple solution for evaluating the signals picked up by the microphone. Depending on the requirements it is possible to use even simpler evaluation circuits especially in the case when only a single injection nozzle is tested, or more complex constructions. For instance, the output of the integrator 41 can be converted in dataword so that the following stages can be constructed as digital data processing units. If the microphone is designed as a calibrated unit having a long time stability, the calibrating stage 23 can be dispensed with.

It will be understood that each of the elements described above, or two or more together, may also find a useful application in other types of constructions differing from the types described above.

While the invention has been illustrated and described as embodied in specific examples of the injection testing device for use in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of measuring the quantity of fuel injected by a nozzle of an injection pump, comprising the steps of injecting fuel through a nozzle under test into a closed air space and detecting the resulting pressure pulse by a microphone, and then integrating the output signals from the microphone and evaluating the integral signal as a measure of the quantity of the injected fuel.

2. A method as defined in claim 1, wherein the air space is sealed by a body of liquid and held at a constant height by an overflow of the liquid.

3. A method as defined in claim 2, wherein an overpressure is created in the air space.

4. A device for determining the quantity of fuel injected by a nozzle of an injection pump, comprising a container for enclosing an air space at its top part and a body of sealing liquid at its bottom part; means for mounting a nozzle to be tested at the top of the container so as to inject fuel delivered by an injection pump into the air space; a microphone communicating with the air space to convert air pressure pulses resulting during injection into corresponding electrical signals; and means for integrating the electrical signals into an integral signal which is the measure of the quantity of the injected fuel.

5. A device as defined in claim 4, wherein the bottom part of the container is provided with an overflow device for the liquid body.

6. A device as defined in claim 5, further comprising a calibrating device connected to an output of the overflow device and including a reference volume chamber.

7. A device as defined in claim 6, wherein the integrated signal from the integrating means is corrected by a signal derived from the calibrating device.

8. A device as defined in claim 5, comprising a pressure regulator installed in said overflow device to generate an overpressure in the air space of the container, said microphone having a diaphragm communicating with the air space in the container and the rear side of the diaphragm communicating with the air space via a throttle.

9. A device as defined in claim 13, wherein the microphone is enclosed in a pressure chamber.

10. A device as defined in claim 4, wherein the microphone communicates with the air space in the container via a pressure pipe.

11. 8. A device as defined in claim 4, wherein the top of the container includes mounting means for receiving a plurality of nozzles to be tested.

12. A device as defined in claim 11, further comprising means for coordinating respective nozzles with the integrating means in response to an angular position of the injection pump.

13. A device as defined in claim 12, wherein the integrating means includes a multiposition switching device having a plurality of contacts assigned to respective nozzles.

14. A device as defined in claim 4, further comprising a temperature sensor arranged in the air space, and means for correcting the integrating signal in dependency on the signal from the temperature sensor.

* * * * *